(12) United States Patent
Tseng

(10) Patent No.: US 6,198,988 B1
(45) Date of Patent: Mar. 6, 2001

(54) METHOD FOR DETECTING AN ERRONEOUS DIRECTION OF TRAVEL SIGNAL

(75) Inventor: Hongtei Eric Tseng, Canton, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/131,635

(22) Filed: Aug. 10, 1998

(51) Int. Cl.$^7$ .............................. G06F 7/00; G06F 17/00
(52) U.S. Cl. .................................. 701/1; 701/72; 701/44; 303/146; 303/140; 180/412; 180/413; 180/410; 180/421
(58) Field of Search .................................. 701/1, 72, 41; 180/446, 410, 412, 413, 421; 303/140, 146

(56) References Cited

U.S. PATENT DOCUMENTS

| | | | |
|---|---|---|---|
| 5,261,503 | * | 11/1993 | Yasui .................................. 180/446 |
| 5,267,627 | | 12/1993 | Frank et al. . |
| 5,313,389 | | 5/1994 | Yasui . |
| 5,333,058 | * | 7/1994 | Shiraishi et al. ...................... 701/72 |
| 5,457,632 | * | 10/1995 | Tagawa et al. ....................... 701/43 |
| 5,576,957 | * | 11/1996 | Asanuma et al. ..................... 701/42 |
| 5,617,337 | | 4/1997 | Eidler et al. . |
| 5,642,281 | * | 6/1997 | Ishida et al. ......................... 701/41 |
| 5,686,662 | | 11/1997 | Tracht et al. . |
| 5,694,319 | * | 12/1997 | Suissa et al. ......................... 701/41 |
| 5,707,117 | * | 1/1998 | Hu et al. ....................... 303/122.08 |
| 5,710,705 | * | 1/1998 | Eckert .................................. 701/83 |
| 5,719,790 | | 2/1998 | Lohrenz et al. . |
| 5,732,372 | | 3/1998 | Marsden . |
| 5,746,486 | * | 5/1998 | Paul et al. ........................... 303/146 |
| 5,799,745 | * | 9/1998 | Fukatani ............................. 180/410 |
| 5,864,769 | * | 1/1999 | Inagaki et al. ...................... 701/70 |
| 5,869,753 | * | 2/1999 | Asanuma et al. .................. 73/117.3 |
| 5,931,546 | * | 8/1999 | Nakashima et al. . |
| 5,941,919 | * | 8/1999 | Pastor et al. ........................ 701/36 |
| 5,964,819 | * | 10/1999 | Naito ................................... 701/72 |
| 6,085,860 | * | 7/2000 | Hackl et al. ....................... 180/443 |
| 6,092,882 | * | 7/2000 | Matsuno .............................. 303/146 |

FOREIGN PATENT DOCUMENTS 4-254259  9/1992  (JP) .

* cited by examiner

Primary Examiner—William A. Cuchlinski, Jr.
Assistant Examiner—Olga Hernandaz
(74) Attorney, Agent, or Firm—Gregory P. Brown

(57) ABSTRACT

A method for detecting an erroneous travel direction or a defective yaw rate sensor 12 is disclosed. Two estimates of the vehicle yaw rate are gathered from separate criteria and are compared with one another as well as the measured vehicle yaw rate. Using these comparisons along with other information regarding vehicle travel, a conclusion of whether a travel direction signal is erroneous is made. This determination can then be used to modify the vehicle's brake control strategy.

16 Claims, 2 Drawing Sheets

METHOD FOR DETECTING AN ERRONEOUS DIRECTION OF TRAVEL SIGNAL

BACKGROUND OF THE INVENTION

1. Field of the Invention

The present invention relates generally to a method of detecting an erroneous signal. More particularly, the present invention relates to a method for detecting an erroneous direction of travel signal as used in a motor vehicle yaw control system.

2. Disclosure Information

Automotive vehicles with braking systems which respond to vehicle conditions as well as driver input have been produced. For example, when a particular yaw rate that is desired by a driver's steering wheel operation is not producing an adequate yaw rate, the braking system of the vehicle may compensate by altering a particular wheel's speed. However, when a vehicle is traveling reverse its normal operation direction, this response may not be appropriate. For this reason, it is necessary to provide the brake system with some indication of vehicle travel direction, e.g. forward or reverse. Further, it would be desirable to provide a system capable of robustly detecting an erroneous travel direction indication.

U.S. Pat. No. 5,686,662 ('662) addresses this problem by gathering two estimates of yaw rate, one estimate from the speeds of the left and right undriven wheels, and the other estimate from vehicle speed, steering wheel position, and lateral acceleration. A yaw rate is then measured using a yaw rate sensor. Finally a reverse travel condition is indicated if the signs of the first two estimates are opposite that of the measured yaw rate. However, under various operating conditions, the system described in '662 may have robustness difficulties. For instance, the correction coefficient, $\omega_c$, is unknown at vehicle start-up, and thus for an indeterminate period of initial vehicle operation, one of the two estimates of vehicle yaw rate can not be independently determined in a manner which will allow robust detection of a reverse travel direction. Also, the '662 patent assumes that a difference in signs between the estimates and the measured yaw rate indicate a reverse travel direction, whereas such an instance could occur due to a yaw sensor fault.

It would be desirable to provide a method for indicating an erroneous travel direction that is robust to faults and disturbances of the wheel speed sensor, steering wheel sensor, and yaw rate sensor, operative from the moment of vehicle start-up.

SUMMARY OF THE INVENTION

There is disclosed herein a method for detecting an erroneous direction of travel signal for use in actively controlling the yaw of a motor vehicle. In order to detect an erroneous travel direction, the present invention first establishes two yaw rate estimates using different data to calculate each estimate. The present invention then calculates the difference between these two estimates, and halts the analysis if this difference is greater than a predetermined threshold. However, if this difference is less than a predetermined threshold, the present invention continues by calculating the difference between the measured yaw rate of the yaw rate sensor and one of the yaw rate estimates. Finally, if this difference is greater than a predetermined threshold, an erroneous travel direction is indicated. If this difference is less than a predetermined threshold, normal operation is indicated by the present invention, with no erroneous travel direction being indicated.

DETAILED DESCRIPTION OF THE PREFERRED EMBODIMENTS

Figure 1:
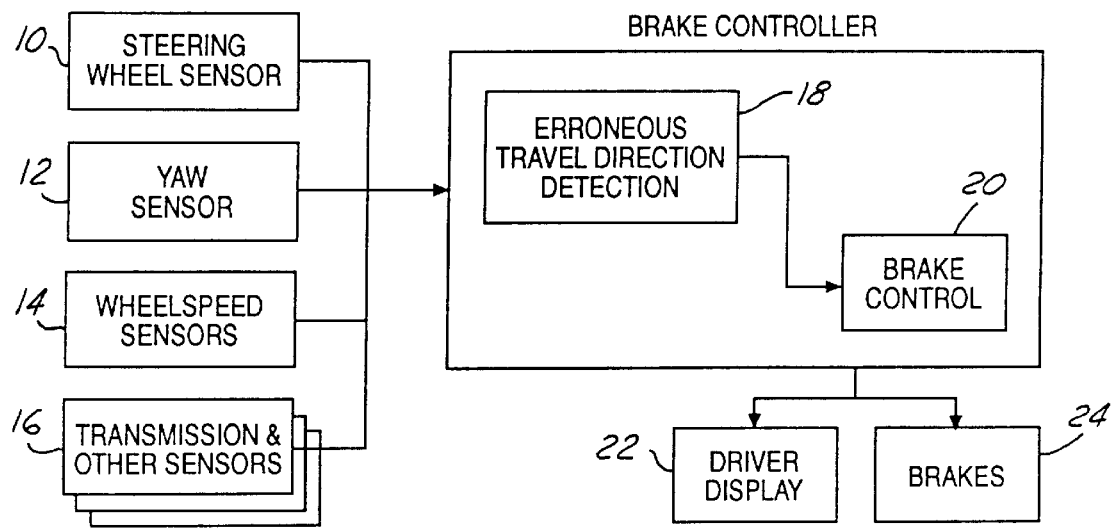
FIG. 1 is a schematic block diagram of a control system in accordance with the present invention.

Referring now to FIG. 1, a schematic block diagram of a brake control system is illustrated. The system includes a brake controller 8 that receives data from a steering wheel sensor 10, a yaw sensor 12, and wheelspeed sensors 14 for performing its analysis. Brake controller 8 ultimately uses this data to detect whether the travel direction signal indicated by a transmission sensor 16, such as a gear position indicator, is erroneous. The brake controller 8 uses this data to calculate two estimates of yaw rate, $r_{est.whlspd}$, $r_{est.swa}$, which can be used to detect an error in the travel direction signal from the transmission sensor 16. Based on this information, the Brake Controller determines the appropriate brake control 20 and actuates brakes 24 and possibly a driver display 22, such as a warning lamp.

The first yaw rate estimate, $r_{est.whlspd}$, is calculated using wheel speed data, according to the following relationship:

$$r_{est.whlspd} = (ws_R - ws_L)/TW$$

where $ws_R$ and $ws_L$ are preferably right and left undriven wheel speeds and TW is a vehicle track width at an axle of the undriven wheels. This relationship provides a magnitude of the first yaw rate estimate and relies on the travel direction signal from the transmission, in combination with the sign of $r_{est.whlspd}$, to determine whether the yaw estimate is clockwise or counter-clockwise.

Similarly, the brake controller calculates the second yaw rate estimate, $r_{est.swa}$, using the steering wheel angle data, SWA according to the following relationship:

$$r_{est.swa} = D*SWA*V_{VEH}/(L+K*V_{VEH}^2)$$

where D is a constant determined through vehicle testing; $V_{VEH}$ is an unsigned longitudinal velocity of the vehicle; K is an understeer constant for the vehicle; and L is the vehicle wheelbase. As with the wheel speed based estimate, this relationship provides only a magnitude of the second yaw rate estimate, requiring the travel direction signal from the transmission, in combination with the sign of $r_{est.swa}$, to determine whether the estimate is clockwise or counter clockwise.

Figure 2:
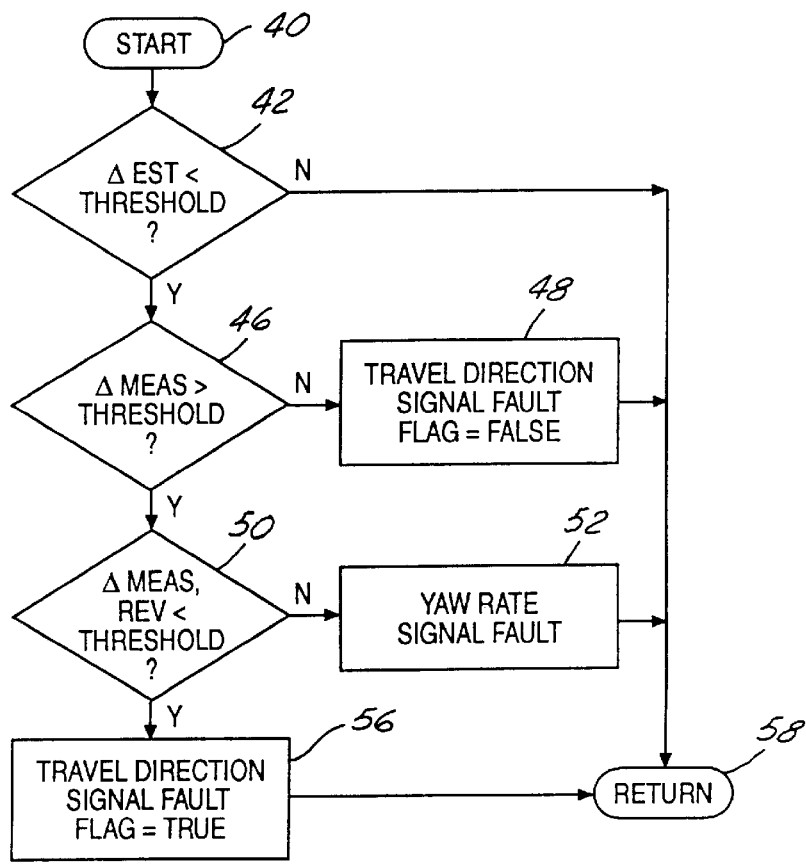
FIG. 2 is a logic flow diagram for a yaw control system adapted to use the information provided by the present invention.

Turning now to FIG. 2, a logic flow diagram of the erroneous travel direction algorithm will now be described. First the brake controller calculates the value of a threshold, T. In the preferred embodiment, this threshold is a variable, dependent on vehicle longitudinal velocity and the steering wheel angle. It has been observed that this allows greater precision in the analysis for detecting an erroneous travel direction signal. Specifically, the threshold is calculated according to the following relationship:

$$T = A + V_{VEH}/B + C*r_{est.whlspd}*SWA$$

where $V_{VEH}$ is the vehicle longitudinal velocity determined from the speed of rotation of the wheels, SWA is the steering wheel angle and $r_{est.whlspd}$, is a vehicle yaw estimate based on wheel speeds described in detail above. A, B and C are constants selected through testing in a development vehicle. It should be noted that it may be desirable to compare the variable threshold, T, with a predetermined threshold value, $T_1$, so that the brake controller returns to starting block 40 when T exceeds $T_1$. This would reflect reduced confidence in error detection based on the estimates of yaw rate determined during normal operation of the vehicle at high speeds and large steering wheel angles. The estimates might be biased due to sizable slip angles at the vehicles tires as well as uncertainty about the size and shape of the vehicle tires at high speeds.

Proceeding to block 42, the brake controller calculates a first difference, Δest, which represents the absolute value of the difference between the two independent estimates of the yaw rate, $r_{est.whlspd}$ and $r_{est.swa}$. brake controller then compares Δest with the current threshold value, T. If Δest is not less than T, then $r_{est.swa}$ and $r_{est.whlspd}$ are not in agreement with one another, indicating that either $r_{est.swa}$ or $r_{est.whlspd}$ is an inaccurate estimate of yaw rate. Under this condition, the brake controller halts further error detection analysis, returning through block 58 to block 40 to restart the analysis. The brake controller will continue in this manner until Δest is less than T, indicating that $r_{est.swa}$ and $r_{est.whlspd}$ are essentially in agreement with one another, at which point the brake controller continues to block 46.

At block 46, the brake controller calculates a second difference, Δmeas, which represents the absolute value of the difference between a measured yaw rate of the vehicle, $r_{meas}$, and one of the two independent yaw rate estimates. In the preferred embodiment, the first yaw rate estimate based on wheel speed data is preferred for determining Δmeas. This preference is due to the likelihood that the yaw rate estimate based on wheelspeed is more precise than that based on steering wheel angle. The brake controller then compares Δmeas with the current threshold value, T. If Δmeas is not greater than T, then $r_{meas}$ and $r_{est.whlspd}$, are in agreement with one another, and the brake controller proceeds to block 48 to set the travel direction signal fault false, indicating that that the vehicle travel direction signal is correctly indicated by the transmission. Support for this conclusion rests in the observation that when $r_{est.swa}$ and $r_{est.whlspd}$ are in agreement with one another, based on the travel direction signal from the transmission, and $r_{meas}$ and $r_{est.whlspd}$, are in agreement with one another, then indicated travel direction is correctly detected. If, however, Δmeas is greater than T, then $r_{meas}$ and $r_{est.whlspd}$, are not in agreement and the brake controller proceeds to block 50 to further evaluate the possibility of an erroneous travel direction signal.

At block 50, the brake controller calculates a third difference, Δmeas.rev, which actually represents the absolute value of the sum of the measured yaw rate, $r_{meas}$, and one of the independent yaw rate estimates. Again, in the preferred embodiment, the first yaw rate estimate, $r_{est.whlspd}$, is preferred for determining Δmeas.rev. The sum of these two values represents the difference between the measured yaw rate, $r_{meas}$, and the yaw rate estimate, $r_{est.whlspd}$, subject to an assumption that the vehicle is actually traveling in the opposite direction than indicated by the transmission. Therefore, if the third difference, Δmeas.rev, is less than T, the brake controller concludes that the travel direction signal indicated by the transmission is in error, as indicated by block 56. If, however, Δmeas.rev is not less than the T, the brake controller proceeds to block 52 and sets a yaw signal fault flag true.

More specifically, the logic of block 50 is supported by the observation that the presence of an erroneous travel direction signal indicated by the transmission causes a properly functioning yaw rate sensor to indicate a yaw rate of the opposite sign and similar magnitude to either of the yaw rate estimates. For example, in this instance, if the yaw rate estimates established by both the steering wheel angle sensor and the wheel speed sensors indicate a clockwise rotation of the vehicle, the properly functioning yaw rate sensor would indicate a counterclockwise rotation. Therefore, when this point in the control logic is reached and Δmeas.rev is not greater than T, the brake controller can reasonably conclude that the travel direction signal indicated by the transmission is erroneous. This being the case, the brake controller proceeds to block 56 where the travel direction signal fault is set to true and the brake controller returns to block 40 through return block 58.

If, on the other hand, Δmeas.rev is not less than the T, the brake controller concludes that measured yaw rate sensor is faulty. This is supported by the deduction that the independent estimates are in agreement and the discrepancy between the estimates and the measured yaw rate is not a reverse direction condition, but rather a disagreement in actual magnitude, which strongly points to a yaw rate sensor fault in the face of two independent estimates being in agreement with respect to magnitude. This being the case, the brake controller proceeds to block 52 where a yaw sensor fault flag is set to true and the brake controller returns to block 40 through block 54 and return block 58.

Figure 3:
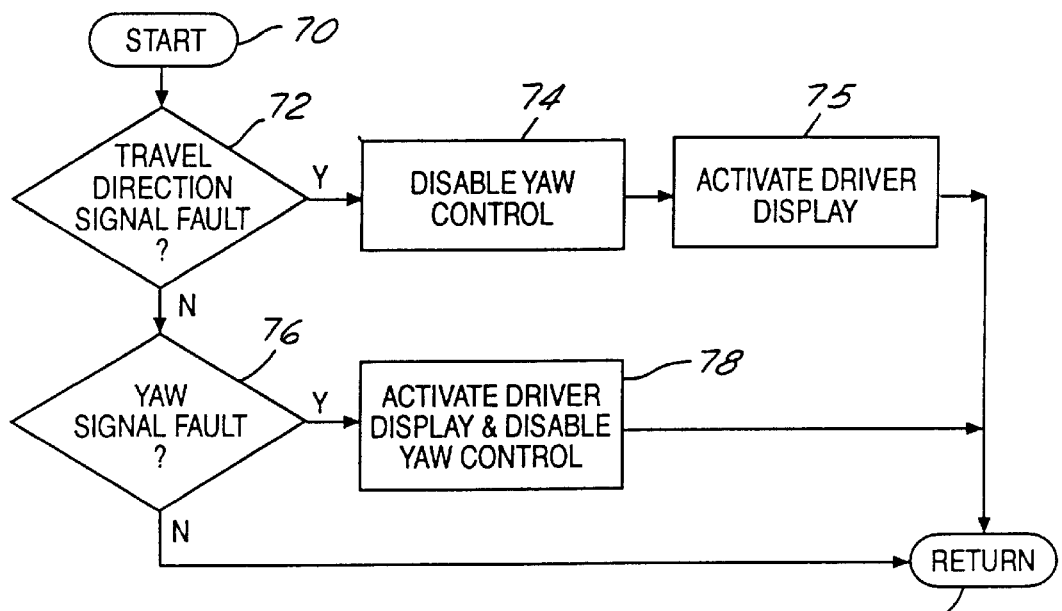
FIG. 3 is a logic flow block diagram of a method for detecting an erroneous direction of travel signal in accordance with the present invention.

Referring now to FIG. 3, a logic flow diagram of a brake control system adapted to use the information derived from the present invention is shown. The brake controller 8 executes the logic flow found in FIG. 3, beginning at block 70 and proceeds to block 72. If an erroneous travel direction has been detected, as indicated by the travel direction signal fault being set to true, the brake controller proceeds to block 74 where any yaw control system the vehicle might possess is disabled. In this instance, the brake controller further proceeds to block 75, where the driver display is activated appropriately. The brake controller then returns to block 70 through block 80.

If, however, no erroneous travel direction has been detected, as indicated by the travel direction signal fault flag being set to false, the brake controller proceeds to block 76. At block 76, if a yaw signal fault has been indicated, the brake controller proceeds to block 78 where the driver of the vehicle is notified as to the faulty condition of the vehicle's yaw rate sensor, through some type of warning light or sound. Further, the vehicle yaw control system is disabled at block 78. From either block 78, or block 76 when no yaw signal fault has been detected, the brake controller returns to block 70 through return block 80.

Various modifications and variations will no doubt occur to those skilled in the arts to which this invention pertains. For example, the particular sensors used in conjunction with the disclosed system may be varied from those herein, as there are numerous possible methods for measuring or estimating the yaw rate of a vehicle. Additionally, the system may be operated with changes to the numerical values of the various thresholds described above while remaining within the calculational and logic flow scheme described herein. These and all other variations which basically rely on the teachings to which this disclosure has advanced the art are properly considered within the scope of this invention as defined by the appended claims.

What is claimed is:

1. A method of detecting an erroneous travel direction signal for use in a yaw control system for a motor vehicle, said method comprising the steps of:

establishing a first yaw rate estimate;

establishing a second yaw rate estimate;

calculating a first difference between said first and second yaw rate estimates;

halting further erroneous travel direction analysis until said first difference is less than a threshold;

obtaining a measured yaw rate signal using a yaw rate sensor;

calculating a second difference between said measured yaw rate signal and one of said first and second yaw rate estimates; and setting a travel direction signal fault false if said second difference is not greater than said threshold and setting said travel direction signal fault true if said second difference is greater than said threshold.

2. A method according to claim 1, further comprises the step of updating said threshold using current vehicle speed, wheel speed and steering wheel angle data.

3. A method according to claim 1, wherein said first yaw rate estimate is calculated using wheel speed data and said second yaw rate estimate is calculated using steering wheel angle data.

4. A method according to claim 1, wherein said second difference is determined using said first yaw rate estimate which is calculated using wheel speed data.

5. A method according to claim 1, wherein said step of setting a travel direction signal fault true further comprises the steps of:

calculating a third difference by summing said measured yaw rate signal and said first yaw rate estimate if said second difference is not less than said threshold; and setting a yaw sensor fault flag true if said third difference is not less than said threshold and setting said travel direction signal fault true if said third difference is less than said threshold.

6. A method according to claim 1, further comprises the step of activating a driver display when said yaw sensor fault flag is true.

7. A method of detecting an erroneous travel direction signal for use in a yaw control system for a motor vehicle, said method comprising the steps of:

establishing a first yaw rate estimate using a first data set;

establishing a second yaw rate estimate using a second data set, said second data set being different than said first data set;

establishing a first yaw rate estimate;

establishing a second yaw rate estimate from different data than used in establishing said first yaw rate estimate;

calculating a first difference between said first and second yaw rate estimates;

halting further erroneous travel direction analysis until said first difference is less than a threshold;

obtaining a measured yaw rate signal using a yaw rate sensor;

calculating a second difference between said measured yaw rate signal and one of said first and second yaw rate estimates; and setting a travel direction signal fault false if said second difference is not greater than said threshold and setting said travel direction signal fault true if said second difference is greater than said threshold.

8. A method according to claim 7, further comprises the step of updating said threshold using current vehicle speed, wheel speed and steering wheel angle data.

9. A method according to claim 7, wherein said first yaw rate estimate is calculated using wheel speed data and said second yaw rate estimate is calculated using steering wheel angle data.

10. A method according to claim 7, wherein said second difference is determined using said first yaw rate estimate which is calculated using wheel speed data.

11. A method according to claim 7, wherein said step of setting a travel direction signal fault true further comprises the steps of:

calculating a third difference by summing said measured yaw rate signal and said first yaw rate estimate if said second difference is not less than said threshold; and setting a yaw sensor fault flag true if said third difference is not less than said threshold and setting said travel direction signal fault true if said third difference is less than said threshold.

12. A method of detecting an erroneous travel direction signal for use in a yaw control system for a motor vehicle, said method comprising the steps of:

establishing a first yaw rate estimate;

obtaining a measured yaw rate signal using a yaw rate sensor;

calculating a second difference between said measured yaw rate signal and said first yaw rate estimate;

setting a travel direction signal fault false if said second difference is not greater than a threshold;

calculating a third difference by summing said measured yaw rate signal and said first yaw rate estimate if said second difference is not less than said threshold; and setting a travel direction signal fault true if said third difference is less than said threshold and setting a yaw sensor fault flag true if said third difference is not less than said threshold.

13. A method according to claim 12, further comprises the step of updating said threshold using current vehicle speed, wheel speed and steering wheel angle data.

14. A method according to claim 12, wherein said second difference is determined using said first yaw rate estimate which is calculated using wheel speed data.

15. A method according to claim 12, further comprises the steps of:

establishing a second yaw rate estimate;

calculating a first difference between said first and second yaw rate estimates; and halting further erroneous travel direction analysis until said first difference is less than said threshold.

16. A method according to claim 15, wherein said first yaw rate estimate is calculated using wheel speed data and said second yaw rate estimate is calculated using steering wheel angle data.

* * * * *